United States Patent
Weeks

(10) Patent No.: US 8,713,184 B2
(45) Date of Patent: Apr. 29, 2014

(54) SYSTEMS AND METHODS FOR ASSIGNING A TEMPLATE TO AN EXISTING NETWORK CONFIGURATION

(75) Inventor: Russell Weeks, Coquitlam (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 166 days.

(21) Appl. No.: 13/327,538

(22) Filed: Dec. 15, 2011

(65) Prior Publication Data
US 2013/0151674 A1 Jun. 13, 2013

Related U.S. Application Data

(60) Provisional application No. 61/568,462, filed on Dec. 8, 2011.

(51) Int. Cl.
G06F 15/16 (2006.01)
G06F 12/00 (2006.01)

(52) U.S. Cl.
USPC .......................................... 709/226; 709/250

(58) Field of Classification Search
USPC .................. 709/203, 220–221, 223–229, 250
See application file for complete search history.

(56) References Cited

U.S. PATENT DOCUMENTS

| | | | | |
|---|---|---|---|---|
| 7,082,386 | B2 * | 7/2006 | Srinivasa | 703/2 |
| 7,536,365 | B2 * | 5/2009 | Aboutalib | 706/15 |
| 8,135,397 | B1 * | 3/2012 | Lall et al. | 455/425 |
| 2002/0144106 | A1 * | 10/2002 | Enomoto | 713/100 |
| 2003/0023413 | A1 * | 1/2003 | Srinivasa | 703/2 |
| 2005/0254438 | A1 * | 11/2005 | Turk et al. | 370/254 |
| 2006/0146707 | A1 * | 7/2006 | Brethereau et al. | 370/230 |
| 2006/0229926 | A1 * | 10/2006 | Homann et al. | 705/9 |
| 2008/0273591 | A1 * | 11/2008 | Brooks et al. | 375/240.01 |
| 2010/0195537 | A1 * | 8/2010 | Pelletier et al. | 370/255 |
| 2011/0071656 | A1 * | 3/2011 | McKiel, Jr. | 700/90 |
| 2011/0307290 | A1 * | 12/2011 | Rolia et al. | 705/7.25 |
| 2011/0320540 | A1 * | 12/2011 | Oostlander et al. | 709/206 |

* cited by examiner

Primary Examiner — Zarni Maung

(57) ABSTRACT

Methods of assigning network service templates in a communication network including a plurality of network elements that are configured to implement a plurality of network services are provided. The methods include providing a plurality of network service templates for a first network service, providing a network service model for providing the first network service by at least one network element in the communication network, comparing the plurality of network service templates with the network service model, and associating at least one network service template with the network service model in response to the comparison.

12 Claims, 11 Drawing Sheets

SYSTEMS AND METHODS FOR ASSIGNING A TEMPLATE TO AN EXISTING NETWORK CONFIGURATION

CROSS-REFERENCE TO RELATED APPLICATIONS

This application claims the benefit of U.S. Provisional Patent Application No. 61/568,462, filed on Dec. 8, 2011, in the U.S. Patent and Trademark Office, the disclosure of which is incorporated herein in its entirety by reference.

FIELD OF THE INVENTION

The present invention relates to network management systems, and in particular to network management systems that manage network services using network service models.

BACKGROUND

The Ericsson IP transport network management system (IPT-NMS) is a network management system that allows users to design, activate and maintain services in a packet- or circuit-switched network.

IPT-NMS unifies 4th Generation network portfolio elements (e.g., 0-3, IP, Ethernet, SDH, CES, WDM, MPLS-TP) under a common, multilayer, multi-domain (e.g., Broadband Access, Microwave, Optical, Edge) Network Management System. With a single network view and fully integrated operations, administration and maintenance (OAM) functionality, smoother network evolution is enabled for SDH-to packet, mobile backhaul, and the building of IP and Ethernet packet networks. IPT-NMS enhances operations with streamlined packet service provisioning across multiple layers and domains, a single, multi-visual (physical, logical, graphical, hybrid) layout with a fully integrated OAM function, and a comprehensive packet feature set for both Transport and virtual private network (VPN) environments.

Referring to FIG. 1, a data communication network 10 generally includes a plurality of data communication nodes 12 interconnected by a routing network 20. The routing network 20 may include a plurality of switches, such as routers 16, that route packets of data within the data communication network 10 based on routing information contained in packet headers. The routers 16 are connected via backbone communication channels 32, which are typically high bandwidth data communication channels. The nodes 12 access the routing network 20 via access channels 34 that are typically lower bandwidth channels. The backbone channels 32 and the access channels 34 may include any suitable physical communication medium, including optical, wired, wireless, etc., using any suitable communication protocol.

A "Network Service" refers to a service supported by a 4th Generation communication system, such as voice telephony, video telephony, video distribution, voice over IP (VoIP), virtual private networking, etc. A "Network Element" refers to a node within the network that receives, stores, processes and/or transmits data in the network. A network element can include a server, a database, a router, a gateway, etc. A "Network Service Model" is a model that represents the configured state of a single Network Service on one or more managed Network Elements. A Network Service Model defines the type and level of service that is allocated at the Network Element to support a particular Network Service. Network Service Models are therefore important tools for managing system resources in a data communications system.

A network management system enables a user to design a Network Service Model and to store the Network Service model in an internal database of the network management system. The network management system can verify the integrity of the Network Service Model before the Network Service is actually implemented. Network Services can then be activated using a designed and tested Network Service Model.

The Network Service Model generation process is illustrated in FIGS. 2 and 3. As shown therein, a network management system includes a model generation engine 52 and a database or store 54 of stored Network Service Templates. The model generation engine may receive network definitions that define the topology of the network and user specifications that define the requirements for a particular Network Service. The network definitions may be obtained from a data store that may be local or remote from the network management system 50. In some cases, the network definitions may be obtained directly from managed Network Elements. The network management system and/or the user may select one or more Network Service Templates from the database 54, and the model generation engine 52 generates a Network Service Model from the selected Network Service Templates, the user specifications and the network definitions.

When a user designs and activates a Network Service via the network management system, one or more portions of the corresponding Network Service Model may be generated from one or more Network Service Templates. A Network Service Template is a template that is stored in a database of the IPT NMS and that provides a framework for designing a Network Service Model. A Network Service Template may not be associated directly with a Network Service. Rather, the Network Service Template exists purely within the network management system, and is not directly referenced by any part of the Network Element configuration.

During the Network Service design process, one or more Network Service Templates may be used for various purposes, such as filtering out incompatible Network Elements or configuration options from the service design workflow, providing sensible default values for configurable parameters, restricting configurable parameters based on service requirements, etc.

For instance, if a Network Service Template indicates that the service must provide a best-effort Committed Information Rate (CIR) of 1 Gbps, the network management system service design logic can prohibit the user from selecting device resources that are not capable of providing this throughput.

The Network Service Template continues to be useful even after the Network Service Model is activated in the network. For instance, the Network Service Template may be used to ensure that the current configuration of a Network Service matches its required configuration in the corresponding Network Service Model. For example, if an active Network Service is only capable of providing 100 Mbps throughput, but its corresponding Network Service Model is associated with a template requiring 1 Gbps throughput, the network management system can raise an alarm condition to indicate that this Network Service Model should be repaired by a service designer. This way, the network management system can use Network Service Templates to enforce customer Service Level Agreements (SLAs).

The Network Service Template can provide an "at-a-glance" characterization of a network service such as "Bronze/Silver/Gold DSL", "50 MBit VPN" etc. Service Maintainers can use this characterization to determine how quickly to address or escalate faults.

When a network management system is installed in a network with existing Network Services (a so-called "Brown Field" network), part of the installation process may include generating a Network Service Model for each existing Network Service. This logic may be referred to as the Service Discovery process. Part of the Service Discovery process associates each generated Network Service Model with a Network Service Template.

The Service Discovery process is illustrated, for example, in FIG. 3. As shown therein, a network management system 50 receives a set of network definitions that define the topology of the communications network (block 62). The network management system 50 then discovers network services that are supported by the network, for example, by querying network elements (block 64). The network management system 50 then generates a network service model for the identified Network Services (block 66). Finally, the network management system 50 associates each network service model with one or more pre-existing network service template (block 68).

If the Service Discovery process does not exist, the network management system user may be required to manually create a Network Service Model corresponding to each existing Network Service as part of the network management system installation process. During this manual process, the user can explicitly associate a Service Template and one or more Endpoint Templates (Service Templates and Endpoint Templates are two types of Network Service Templates) with a generated Network Service Model. However, this manual process may present a great burden on the user when thousands or tens of thousands of Network Services exist in the network.

Conventionally, a network management system has three options for assigning a Network Service Template to a Network Service Model in the Service Discovery process.

First, the network management system can assign a "catch-all" Network Service Template to each new Network Service Model. This is not desirable because such a template must be generic enough to satisfy every potential Network Service Model. In this scenario, the network management system could not detect when the parameters of a specific Network Service no longer match its required configuration, and customer SLAs could not be guaranteed.

Second, the network management system could assign a new Network Service Template to each new Network Service Model. This approach is not desirable because it violates the one-to-many relationship from Network Service Templates to Network Services. That is, defining a new Network Service Template for each Network Service will produce too many Network Service Templates in the network management system's database, which eliminates the benefit of quickly characterizing a Network Service Model based on its associated Network Service Template.

Third, the user could manually assign an appropriate Network Service Template for each Network Service Model. This approach may present an unacceptable burden to users, since even a medium-sized user may have tens of thousands of services active in their network.

SUMMARY

Some embodiments of the invention provide methods of assigning network service templates in a communication network including a plurality of network service elements that are configured to implement a plurality of network services. The methods include providing a plurality of network service templates for a first network service, providing a network service model for providing the first network service by at least one network service element in the communication network, comparing the plurality of network service templates with the network service model, and associating at least one network service template with the network service model in response to the comparison.

The plurality of network service templates define respective first sets of network service parameters for providing the network service, and the network service model defines a second set of parameters for providing the network service.

The methods may further include generating a plurality of third sets of parameters, each of the third sets of parameters including an intersection of one of the plurality of first sets of parameters and the second set of parameters.

The methods may further include defining a plurality of shared coordinate systems based on the plurality of third sets of parameters, and for each of the shared coordinate systems, generating a metric based on the parameters of the network service model and the network service template represented in the shared coordinate system. Comparing the network service model and the plurality of network service templates includes evaluating the metric for the network service model and the plurality of network service templates and comparing the results of the evaluation.

The metric may include a Euclidean distance in each respective shared coordinate system between a first coordinate in the shared coordinate system representing the network service model and a second coordinate in the shared coordinate system representing a selected one of the plurality of network service templates.

The Euclidean distance $d_{TC}$ may be calculated as follows:

$$d_{TC} = \sqrt{\sum_{i \in T \cap C} (t_i - c_i)^2}$$

where $t_i$ is the value of the ith parameter defined in the network service template T and $c_i$ is the value of the ith parameter in the network service model C.

The methods may further include normalizing values of the parameters before evaluating the metric. Normalizing the values of the parameters may include normalizing the values of the parameters based on values of the parameters in the network service model and the plurality of network service templates.

Normalizing the values of the parameters may include normalizing the values of the parameters using the following formulas:

$$p_n = (p_0 - p_{lb})/(p_{ub} - p_{lb})$$

$$c_n = (c_0 - p_{lb})/(p_{ub} - p_{lb})$$

where $p_n$ is the normalized parameter in the network service templates, $c_n$ is the normalized parameter in the network service model, $p_0$ is the non-normalized parameter in the network service templates, $c_0$ is the non-normalized parameter in the network service model, $p_{lb}$ is the lower boundary of the parameter in the network service templates and the network service model, and $p_{ub}$ is the upper boundary of the parameter in the network service templates and the network service model.

Evaluating the metric may include disregarding network service templates for which a parameter of the network service template is less favorable than a corresponding value of the parameter defined in the network service model.

Evaluating the metric may include disregarding network service templates that do not define values for all of the parameters for which values are defined in the network service model.

The methods may further include weighting the metric before making the comparison.

Weighting the metric may be performed in accordance with the following equation:

$$d_{TC} = \frac{M * \sqrt{\sum_{i \in T \cap C}(t_i - c_i)^2}}{|T \cap C|}$$

where M is a maximum cardinality of all of the network service templates.

In other embodiments, weighting the metric maybe performed in accordance with the following equation:

$$d_{TC} = \frac{M * \sqrt{\sum_{i \in T \cap C}((w_i)(t_i - c_i))^2}}{|T \cap C|}$$

where M is a maximum cardinality of all of the network service templates and $w_i$ is a weight assigned to the ith parameter.

The network service may include a point-to-point service that defines service parameters for first and second endpoints, and the methods may further include evaluating a combined metric for both endpoints.

A network management node according to some embodiments includes a model generation engine, and a data store that stores network service templates. The model generation engine is configured to compare the plurality of network service templates with a network service model, and to associate at least one network service template with the network service model in response to the comparison.

Other network nodes, and/or methods according to embodiments of the invention will be or become apparent to one with skill in the art upon review of the following drawings and detailed description. It is intended that all such additional network nodes, and/or methods be included within this description, be within the scope of the present invention, and be protected by the accompanying claims. Moreover, it is intended that all embodiments disclosed herein can be implemented separately or combined in any way and/or combination.

DETAILED DESCRIPTION

Embodiments of the invention provide systems and/or methods that determine a set of "best-fit" Network Service Templates for a given Network Service Model. These systems/methods enable automatic assignment of Network Service Models that are generated, for example, in a Service Discovery process, to existing Network Service Templates. Accordingly, these systems/methods may greatly decrease the amount of manual effort required to assign Network Service Models to Network Service Templates effectively in complex networks.

Embodiments of the invention may determine a "best fit" template for a defined Network Service Model by defining a multidimensional coordinate space for each Network Service Template/Network Service Model pair in which each axis in the multidimensional coordinate space corresponds to a parameter that is shared between the Network Service Model and the Network Service Template. This multidimensional coordinate space is referred to herein as a "shared coordinate system."

The systems/methods assign coordinates to each Network Service Model and each Network Service Template in the shared coordinate system, and determine one or more metrics for each Network Service Template. The "best fit" Network Service Template may be selected as the Network Service Template that maximizes, minimizes or otherwise satisfies a selected metric. In some embodiments, the metric may be the Euclidean distance between the Network Service Model and each Network Service Template within the shared coordinate system, and the "best fit" for the Network Service Model may be the Network Service Template that has the smallest Euclidean distance from the Network Service Model within the shared coordinate system. In some embodiments, the parameters corresponding to axes in the shared coordinate space may be normalized before calculating the metric.

In the following description, an Endpoint Template is used as an example of a Network Service Template. The Endpoint Template specifies a set of Quality of Service (QoS) parameters for an endpoint, or node, in a network. A Bandwidth Profile, which represents the QoS configuration for a single endpoint of an Ethernet service, is used as an example of a Network Service Model. However, embodiments of the present invention are applicable to many different types of Network Service Templates and Network Service Models, including any Network Service Template or Model that has parameters that can be expressed as a set of numeric values.

Figure 1:
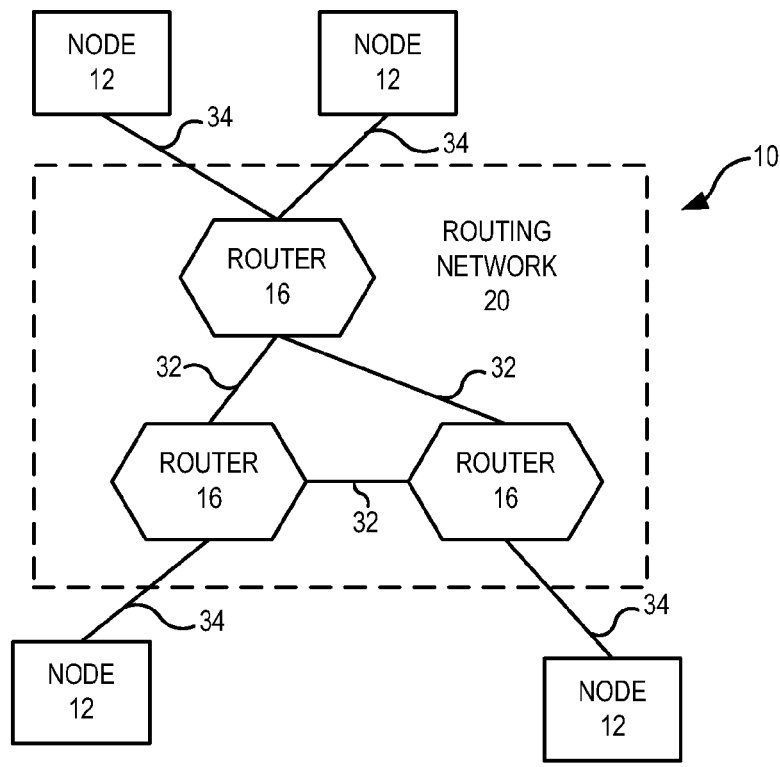
FIG. 1 is a schematic diagram illustrating portions of a data communication network.
Figure 2:
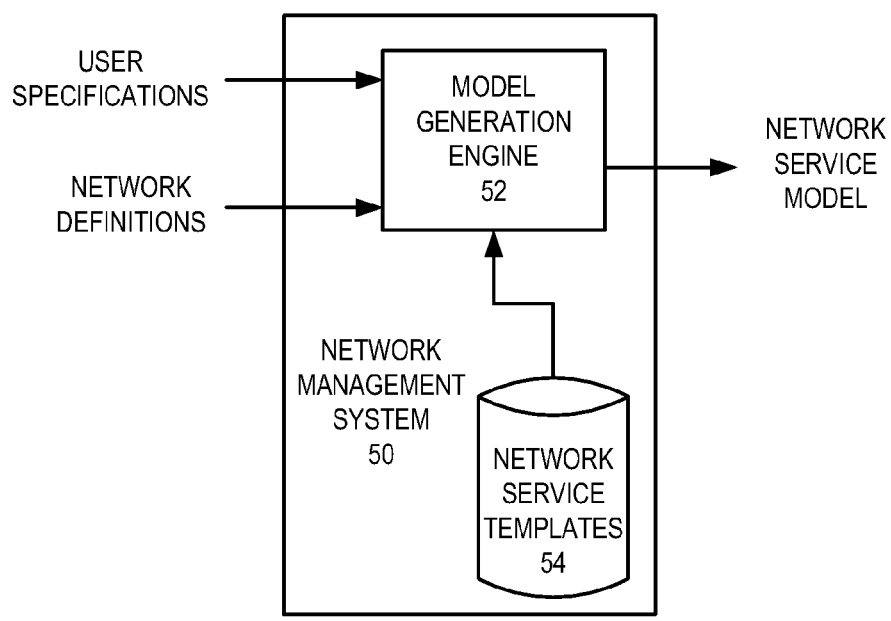
FIG. 2 is a schematic diagram of a network management system in accordance with some embodiments.
Figure 3:
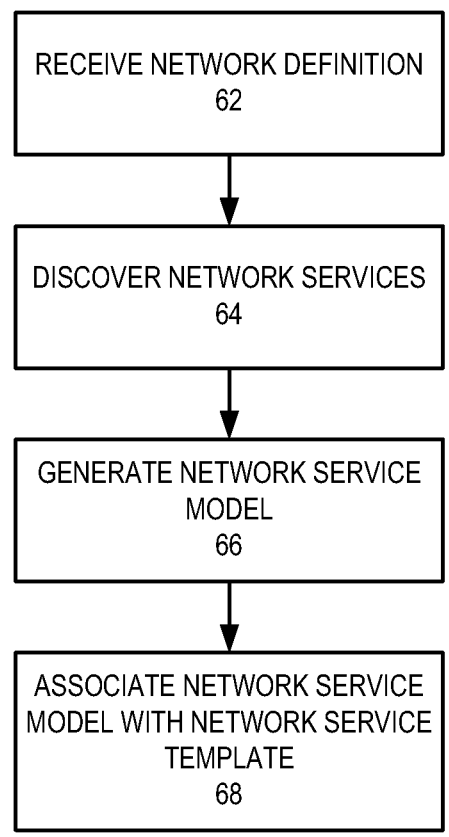
FIG. 3 is a flowchart that illustrates systems/methods that perform Network Services discovery.
Figure 4:
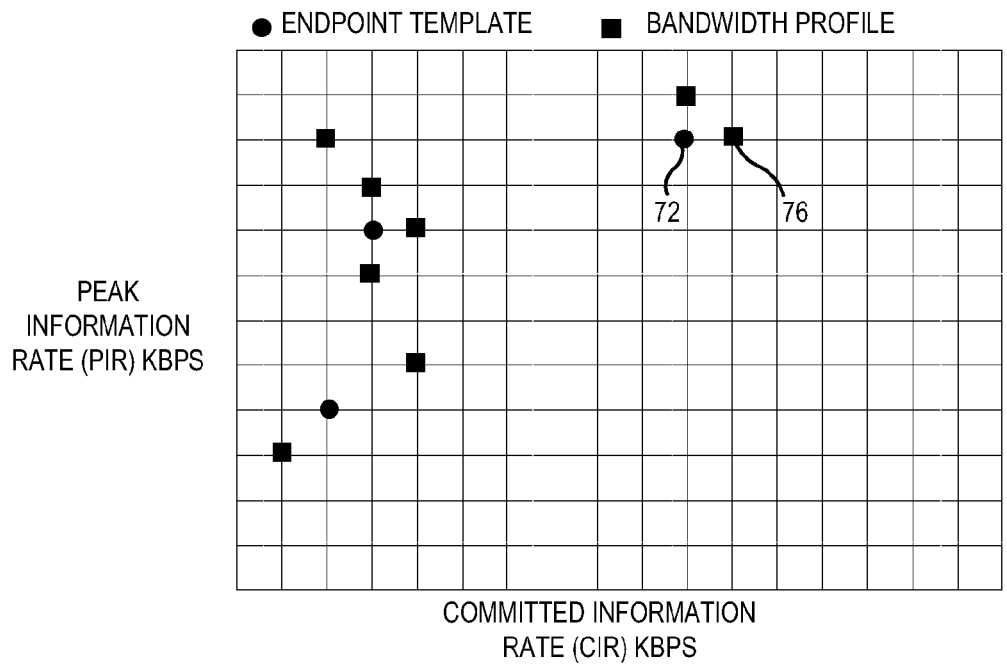
FIGS. 4-7 are graphs of two dimensional shared coordinate systems illustrating methods of associating Network Service Templates with Network Service Models according to some embodiments.

FIG. 4 is a graph of a two dimensional coordinate system on which particular endpoint templates 72 and bandwidth profiles 76 are plotted. In particular, each Endpoint Template 72 is characterized by a required Committed Information Rate (CIR) and Peak Information Rate (PIR), while each Bandwidth Profile is characterized by a configured CIR and PIR.

Figure 5:
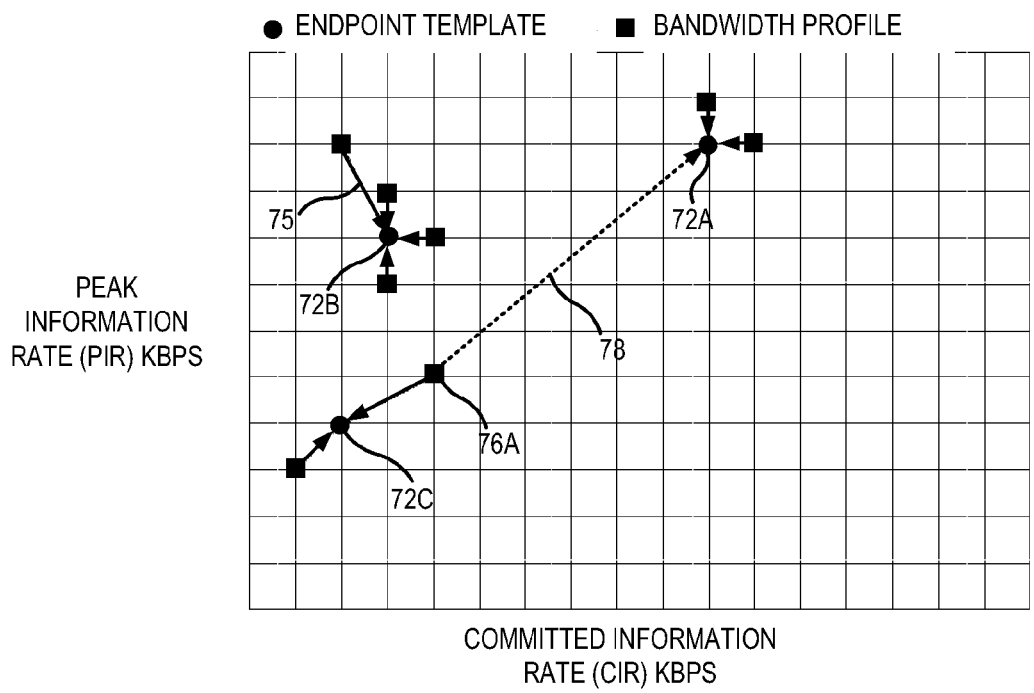

FIG. 5, which includes the same graph as FIG. 4, shows how each Bandwidth Profile 76 may be assigned to or associated with a particular Endpoint Template 72. In particular, in some embodiments, each bandwidth profile 76 may be associated with the endpoint template 72 that it is closest to in a Euclidean distance sense in the two-dimensional coordinate system. To determine which endpoint template 72 is closest to a particular bandwidth profile 76, the systems/methods may calculate the distance from the Bandwidth Profile 76 to each Endpoint Template 72 and select the endpoint template 72 that has the smallest distance in the shared coordinate system for association with the bandwidth profile 76. The solid arrows 75 in FIG. 5 illustrate that each bandwidth profile 76 is associated with a closest endpoint template 72 in the shared coordinate system.

It will be appreciated that other metrics or conditions may be applied before or after calculation of the metric. For example, in some embodiments, the systems/methods may require that a Network Service Model can only be associated with a Network Service Template for which each parameter of the Network Service Template meets or exceeds the corresponding parameter in the Network Service Model.

For example, if the Network Service Model defines a requirement for CIR for Ingress communications in a particular traffic class (e.g., TC7) of 1000 kbps, an endpoint template that defines a requirement for CIR for Ingress communications in the traffic class of less than 1000 kbps will be ignored in the metric calculation and will not be treated as a candidate for association with the Network Service Model. [Traffic class refers to a particular level of service, or QoS, or SLA supported by a Network Element. Traffic classes can be generally identified as TC0, TC1, etc., and may correspond to defined levels of service, such as Best Effort, Background, Excellent Effort, Critical Applications, Video, Voice, Internetwork Control, Network Control and Customer, etc.]

This is illustrated in FIG. 5. As shown therein, bandwidth profile 76A is closest to endpoint template 72C in a Euclidean sense. However if a condition is applied that requires each parameter of associated endpoint template to meet or exceed the corresponding parameter of the bandwidth profile, then endpoint template 72C would be disqualified as a candidate Network Service Template, as it defines a lower level of both CIR and PIR than the bandwidth profile 76A. The endpoint template 72B would also be disqualified because it defines a lower level of CIR than the bandwidth profile 76A, even though it defines a higher level of PIR than the bandwidth profile 76A. Accordingly, the bandwidth profile 76A would be associated with the endpoint template 72A (as indicated by the dashed arrow 78), which is the closest Network Service Template that satisfies the required condition.

In other embodiments, the systems/methods may require that a Network Service Model can only be associated with a Network Service Template that defines at least the same service parameters as are defined for the Network Service Model (or a defined subset of service parameters).

For example, if the Network Service Model defines a requirement for CIR for Ingress communications in traffic class TC7, an endpoint template that does not define a requirement for CIR for Ingress communications in traffic class TC7 will be ignored in the metric calculation and will not be treated as a candidate for association with the Network Service Model.

These conditions may prevent the Network Service Model from being associated with a Network Service Template that may not provide a desired or necessary level of service for the Network Service Model.

Moreover, for a given Network Service Model, the metric may be calculated only for those Network Service Templates that satisfy a given condition, which may reduce processing requirements. The metric may then be calculated for a reduced number of Network Service Templates, with a guarantee that the Network Service Template with the best metric will be at least sufficient to meet the needs of the associated Network Service Model.

In other embodiments, however, it may be desirable to associate a Network Service Model with a Network Service Template that does not meet or exceed all requirements of the Network Service Model. In that case, an alarm may be raised through the user interface of the Network Management System prompting the user to review the association.

FIGS. 4 and 5 are simplified illustrations, in that only a few endpoint templates 72 and bandwidth profiles are illustrated. In a medium-sized customer network, there may be tens of thousands of Bandwidth Profiles representing the configured state of active Network Services, and potentially hundreds of Endpoint Templates representing customer SLAs.

FIGS. 4 and 5 are also simplified in that they are only two dimensional. Typically, a Network Service Model, such as a bandwidth profile 76 and a Network Service Template, such as an endpoint template 72, may share more than two parameters. Therefore, the shared parameter system in which the metric is evaluated may have more than two dimensions. For example, the Euclidean distance between a Network Service Model and a Network Service Template may require calculation in more than two dimensions.

For example, an exemplary bandwidth profile may specify 4 attributes: Committed Information Rate (CIR), Peak Information Rate (PIR), Committed Burst Size (CBS), and Peak Burst Size (PBS), for each of 8 traffic classes TC0 to TC7 (Best Effort, Background, Excellent Effort, Critical Applications, Video, Voice, Internetwork Control, Network Control and Customer), producing a 32-dimension coordinate system.

The attributes of the bandwidth profile may be measured in different units (e.g., CIR may be measured in Mbps, while CBS may be measured in Kb). Accordingly, it may be desirable in some embodiments to normalize the units prior to calculation of the metric.

Figure 6:
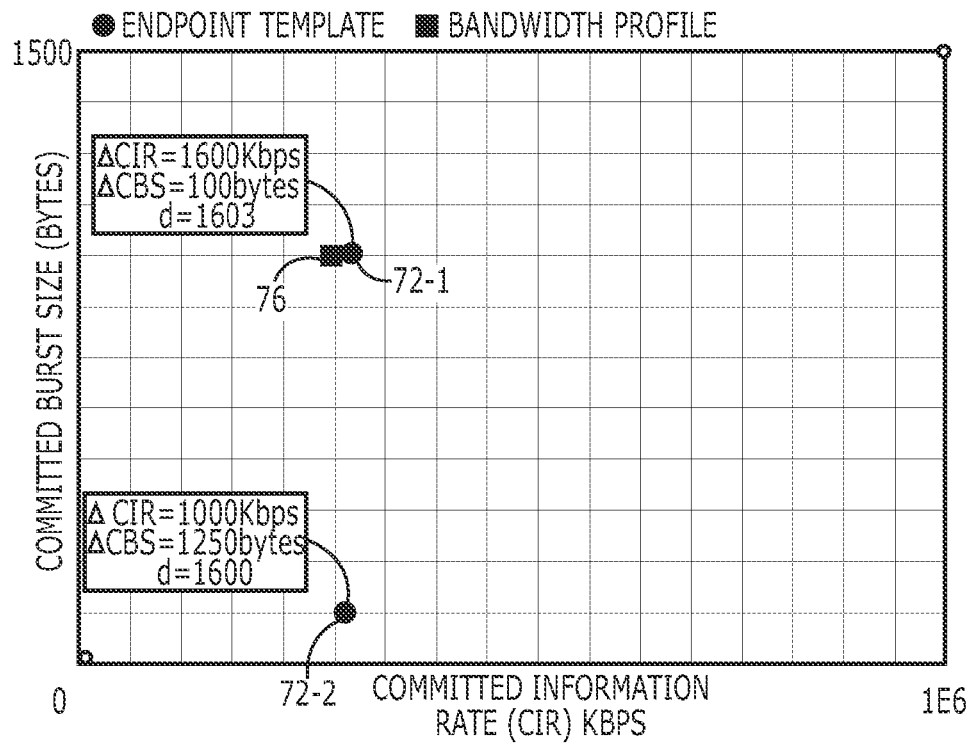
Figure 7:
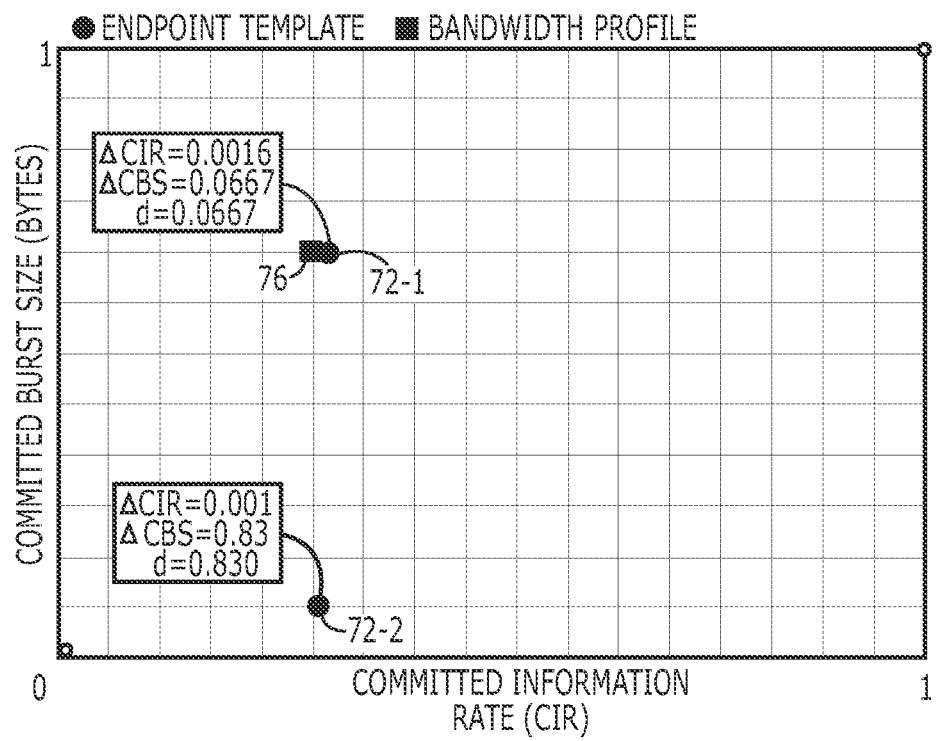

Normalization is illustrated in FIGS. 6 and 7, which are two dimensional shared coordinate systems that graph endpoint templates 72-1, 72-2 and a bandwidth profile 76 as functions of CIR and CBS. FIG. 6 represents non-normalized values. The scale of the X-axis (CIR) ranges from 0 to 1,000,000 (1E6), while the scale of the Y-axis (CBS) ranges from 0 to 1500. In the example shown in FIG. 6, the endpoint template 72-1 has ΔCIR of 1600 kbps and ΔCBS of 100 bytes relative to the bandwidth profile 76, while endpoint template 72-2 has a ΔCIR of 1000 kbps and ΔCBS of 1250 bytes relative to the bandwidth profile 76. Without normalization, the Euclidean distance between the endpoint template 72-1 and the bandwidth profile 76 is 1603, and the Euclidean distance between the endpoint template 72-2 and the bandwidth profile 76 is 1600. Without normalization, the much larger range of CIR values causes the endpoint template 72-1 to be rejected in favor of the endpoint template 72-2 even though the endpoint template 72-1 gives a good fit along both axes.

To correct for differences in scale and provide more useful metrics, the parameters may be normalized to have a value between 0 and 1 before the metric is calculated. For example, FIG. 7 shows the locations of the endpoint templates 72-1, 72-2 and the bandwidth profile 76 plotted with normalized values of CIR and CBS. In this example, the values are normalized to the scale of the axes. Once normalized, the endpoint template 72-1 has a normalized ΔCIR of 0.0016 and a normalized ΔCBS of 0.0667 relative to the bandwidth profile 76 for a normalized distance of 0.0667, while endpoint template 72-2 has a normalized ΔCIR of 0.001 and normalized ΔCBS of 0.83 relative to the bandwidth profile 76 for a normalized distance of 0.83. With normalization, therefore, the bandwidth profile 76 would be associated with the endpoint template 72-1 based on a Euclidean distance metric.

Normalization may be performed in accordance with the following equations:

$$p_n = (p_0 - p_{lb})/(p_{ub} - p_{lb}) \quad [1]$$

$$c_n = (c_0 - p_{lb})/(p_{ub} - p_{lb}) \quad [2]$$

where $p_{lb}$ is the lower bound of the property considering all templates and device configurations, $p_{ub}$ is the upper bound of the property considering all templates and device configurations, $p_0$ is the non-normalized template property value, $p_n$ is the normalized template property value, $c_0$ is the non-normalized configuration property value, and $c_n$ is the normalized configuration property value.

Thus, for example, if the maximum CIR across all Network Service Models and Templates under consideration is 10,000 and the minimum CIR across all Network Service Models and Templates under consideration is 0, a template with a non-normalized CIR parameter of 5,000 will have a normalized CIR value of 0.5=(5000−0)/(10000−0).

Not all managed Network Elements support all properties of the Bandwidth Profile; similarly, not all Endpoint Templates specify every QoS parameter. Accordingly, separate shared coordinate systems may be generated for each Network Service Template/Network Service Model pair based on shared attributes of the pair.

Figures 8, 9:
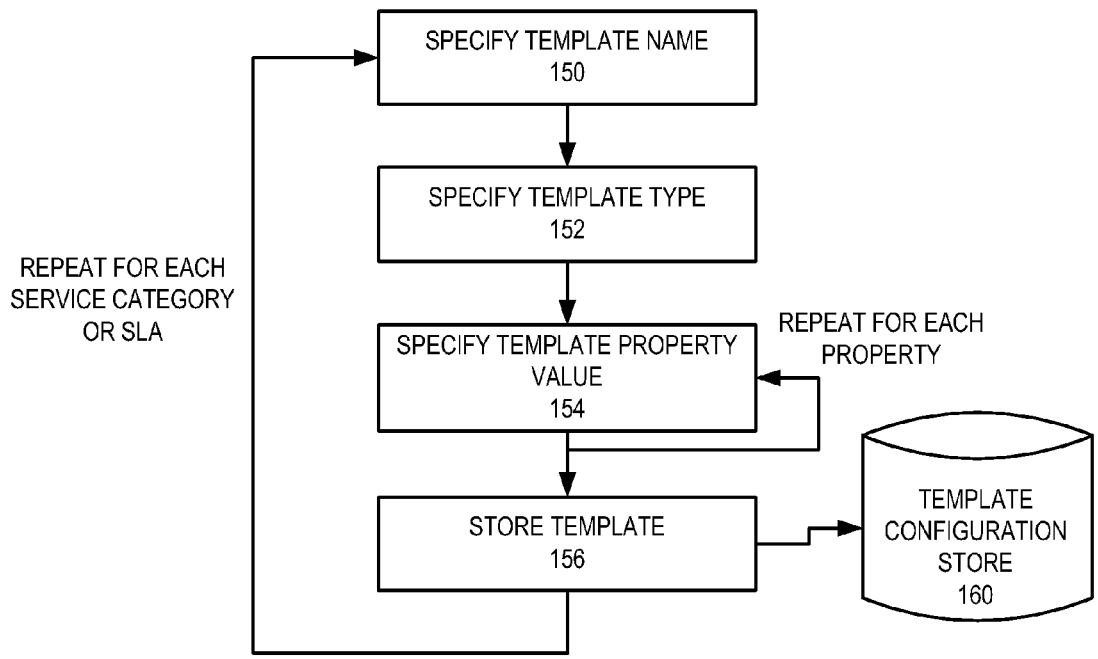
FIG. 8 illustrates the generation of shared property systems for a Network Service Template and a Network Service Model.
FIG. 9 is a flowchart illustrating the generation of Network Service Templates according to some embodiments.

FIG. 8 illustrates two endpoint templates (Endpoint Template #1, Endpoint Template #2) and a Bandwidth Profile. The Bandwidth Profile defines values for Ingress TC0 for CIR, PIR, CBS and PBS, for Ingress TC7 for CIR and PIR, for Egress TC0 for CIR and CBS, and for Egress TC7 for CIR, PIR, CBS and PBS. However, the values for Ingress TC7 CBS and PBS are null (undefined), as are the values for Egress TC0 PIR and PBS.

Similarly, the Endpoint Templates #1 and #2 define values for some parameters, but have null values in others. Moreover, the Endpoint Templates #1 and #2 do not define all of the same parameters.

Based on the values shown in FIG. 8, a shared parameter system for Endpoint Template #1 and the Bandwidth Profile would include Ingress TC0 parameters CIR, PIR, CBS and PBS, and Egress TC0 parameters CIR and CBS. No other parameter is defined by both Endpoint Template #1 and the Bandwidth Profile.

Similarly, a shared parameter system for Endpoint Template #2 and the Bandwidth Profile would include Ingress TC0 parameters CIR and CBS, Ingress TC7 parameter CIR, Egress TC0 parameters CIR and CBS, and Egress TC7 parameters CIR and CBS.

FIG. 9 is a flowchart that illustrates operations of systems/methods for defining Network Service Templates in a network management system. Each service template may represent a characterization or SLA for a collection of Network Service Models. These operations may be performed before starting a service discovery process.

Referring to FIG. 9, for each service category or SLA, a Network Service Template is defined. First, a template name is specified (block 150), and a template type is specified (block 152).

Template property values are then specified for each property in the template (block 154).

Finally, the template is stored in a template configuration store 160 (block 156).

Figure 10:
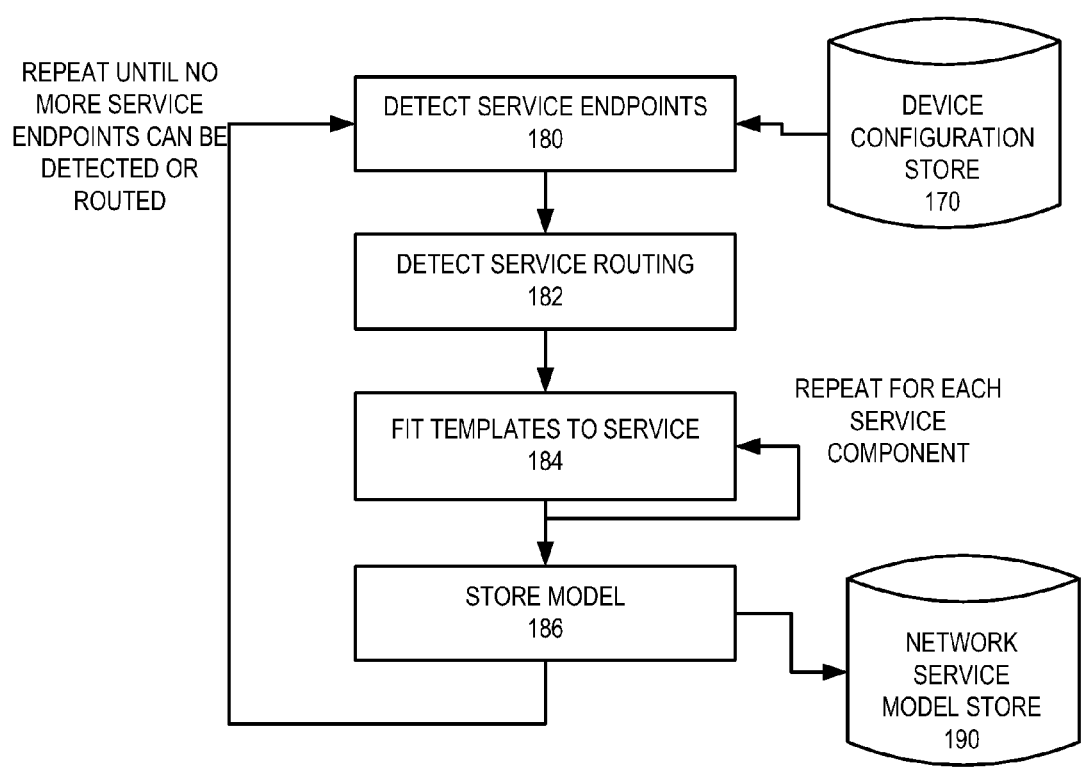
FIG. 10 is a flowchart illustrating the generation of Network Service Models according to some embodiments.

FIG. 10 illustrates a Service Discovery process which builds Network Service Models from a network topology.

Referring to FIG. 10, the systems/methods first detect a service endpoint based on network topology information provided from a device configuration store 170 (block 180). Service routing for the endpoint is then detected (block 182). For each service component requiring a template, one or more templates is/are associated with the service (block 184). The generated model is then stored in a network service model store 190 (block 186). These operations are repeated until no more service endpoints can be detected or routed.

Figure 11:
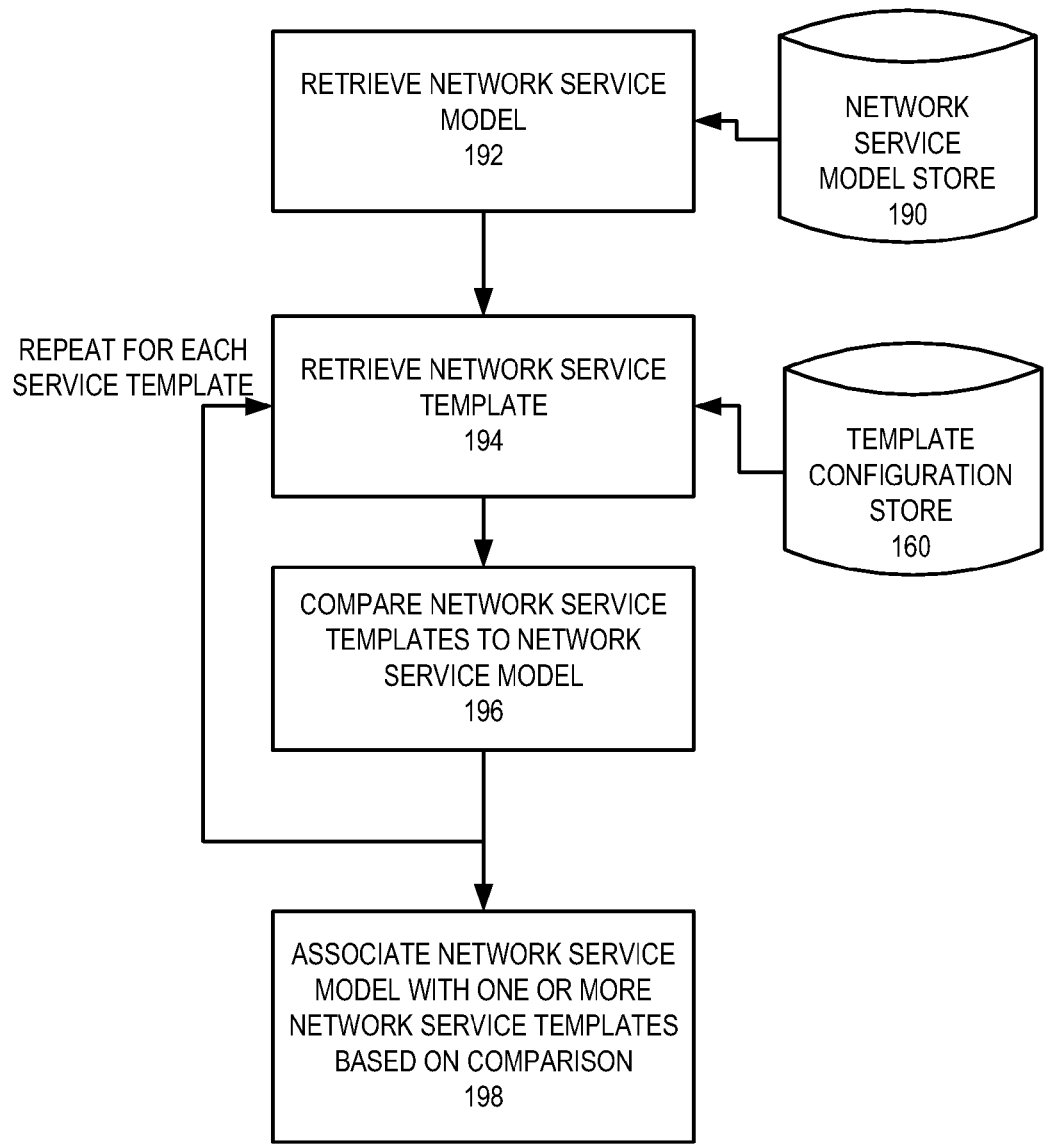
FIG. 11 is a flowchart illustrating the association of a Network Service Model with one or more Network Service Templates according to some embodiments.

FIG. 11 illustrates the association of a Network Service Model with one or more Network Service Templates in accordance with some embodiments. As shown therein, a network service model is retrieved from the network service model store 190 (block 192). A network service template is retrieved from the template configuration store 160 (block 194). The network service model is compared to the network service template, for example, by evaluating a metric to determine how "close" the network service model is to the network service template (block 196).

The operations of blocks 194 and 196 may be repeated for each network service template. In some embodiments, the operations of blocks 194 and 196 may be repeated for only those network service templates that meet a predefined criterion. For example, only those network service templates that define values for each value defined in the network service model may be evaluated.

After each selected network service template has been compared to the network service model, the operations associate the network service model with one or more network service templates based on the comparison (block 198).

Figure 12:
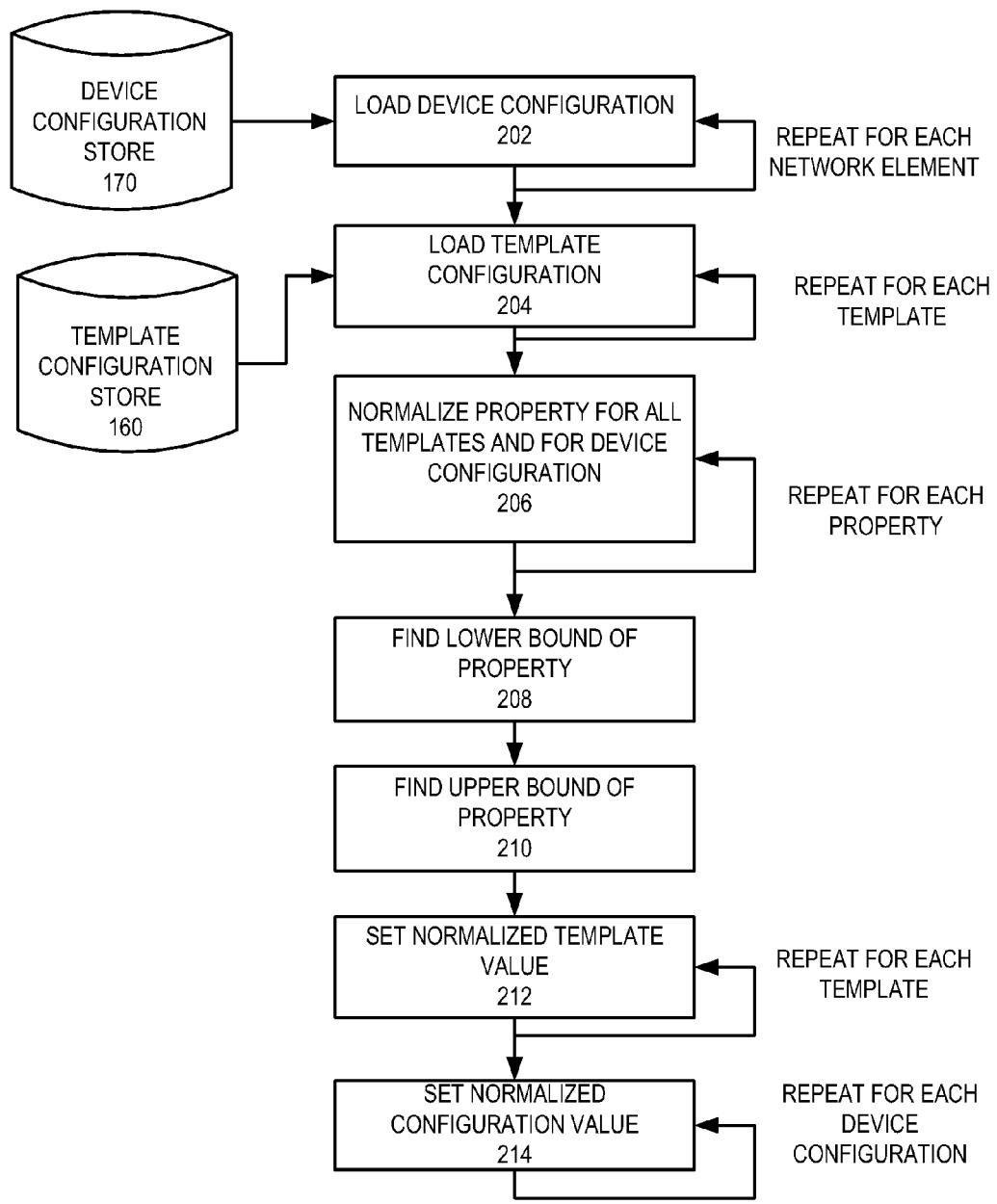
FIG. 12 is a flowchart illustrating the generation of normalized template values and configuration values according to some embodiments.

FIG. 12 shows how the network management system initializes and normalizes parameters of the Network Service Models and Network Service Templates.

Referring to FIG. 12, the network management system first loads device configuration information from a device configuration store 170 (block 202). This step is repeated for each network element in the network.

Next, the network management system loads template configuration information from a template configuration store 160 (block 204). This step is repeated for each template.

The network management system then normalizes each property based on the upper and lower boundaries of the property values across all templates and device configurations (block 206). For each type of template property (for instance, "Ingress Committed Information Rate for TC0/Best-Effort Service"), the network management system determines the range of values for that property (for instance, 1 megabit per second to 1 gigabit per second).

In particular, the network management system finds the lower bound of the property (block 208) and the upper bound of the property (block 210). The network management system then sets the normalized template property value for each template according to equation [1] (block 212), and sets the normalized configuration property value for each device configuration according to equation [2] (block 214).

Accordingly, for each template, the network management system normalizes the value of each property to the range [0,1] using equation [1]. In a shared coordinate space, this property is represented by an axis and the template's value for this property is represented by a position on this axis. The network management system also normalizes each property for all bandwidth profiles. At the end of this process, each template and each bandwidth profile can be assigned a normalized coordinate in each shared coordinate system.

Figure 13:
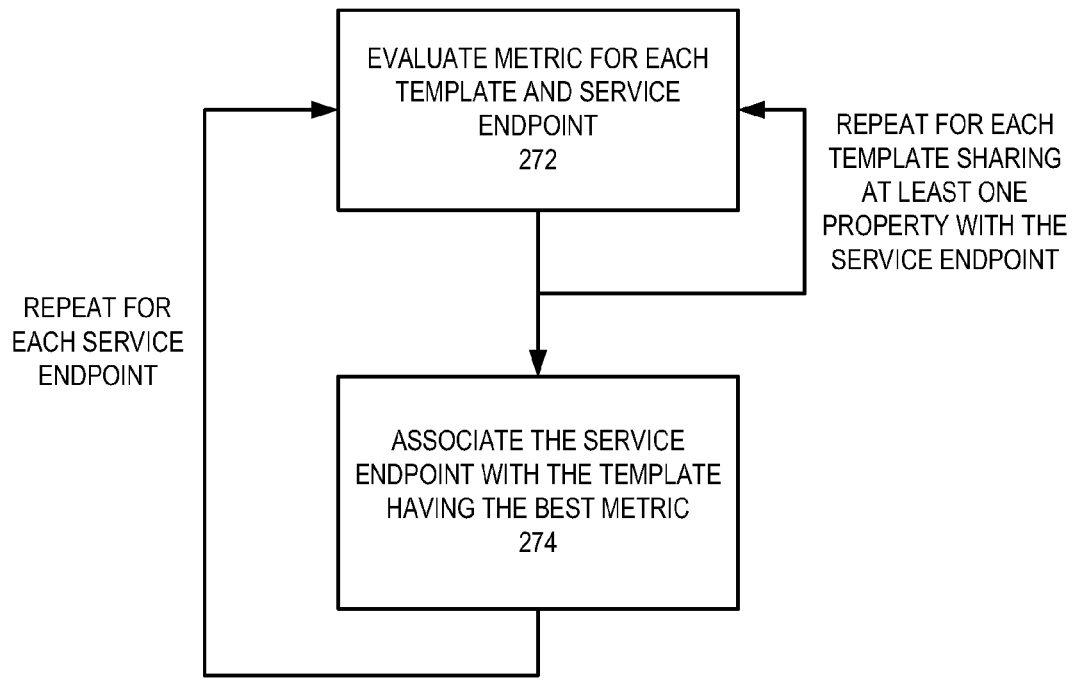
FIG. 13 is a flowchart illustrating systems/methods for associating a template and a service endpoint according to some embodiments.

FIG. 13 shows an embodiment of how the network management system uses the shared coordinate systems to find the best-fit template for each bandwidth profile. Namely, the network management system compares each template to each bandwidth profile to analyze the best fit.

Referring to FIG. 13, the network management system may evaluate a metric for each template and service endpoint pair based on the shared coordinate system of each template/service endpoint pair (block 272). This step may be is repeated for each template that shares at least one property with the service endpoint.

Next, the network management system associates the service endpoint with the template that has the best metric (block 274). These operations may be repeated for each service endpoint.

Figure 14:
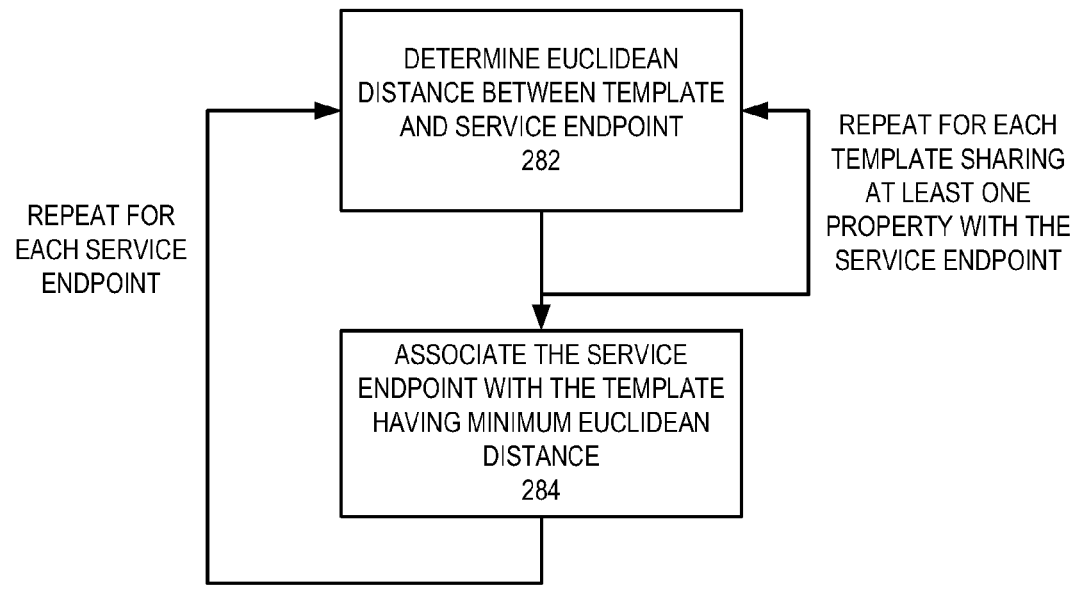
FIG. 14 is a flowchart illustrating systems/methods for determining the Euclidean distance between a template and a service endpoint and associating a template and a service endpoint according to the Euclidean distance according to some embodiments.

FIG. 14 shows a particular embodiment of how the network management system uses Euclidean distance in the shared coordinate systems to find the best-fit template for each bandwidth profile. Referring to FIG. 14, the network management system may determine the Euclidean distance between each template and service endpoint based on the shared coordinate system of each template/service endpoint pair (block 282). This step may be is repeated for each template that shares at least one property with the service endpoint.

Next, the network management system associates the service endpoint with the template that has the smallest Euclidean distance from the service endpoint (block 284). These operations may be repeated for each service endpoint.

The Euclidean distance can be determined as follows:

Let $T=\{p_0, p_2, \ldots, p_n\}$ be the set of properties defined by the template and let $C=\{c_0, c_1, \ldots, c_m\}$ be the set of properties defined by the device configuration. Further, let $t_i=t(i)$ for every i in 0 . . . n be the function mapping a property to its defined value in the template T and let $c_i=c(i)$ for every i in 0 . . . m be the function mapping a property to its defined value In the device configuration C.

Then, the Euclidean distance $d_{TC}$ between template T and configuration C is defined by:

$$d_{TC} = \sqrt{\sum_{i \in T \cap C} (t_i - c_i)^2} \quad [3]$$

Alternatively, the distance can be adjusted by a heuristic, as follows:

$$d_{TC} = \frac{M * \sqrt{\sum_{i \in T \cap C} (t_i - c_i)^2}}{|T \cap C|} \quad [4]$$

where M is the maximum cardinality of all templates T. This heuristic causes the algorithm to prefer templates that share more properties with the device configuration. This heuristic may be further extended to allow the user to specify a preference or weight for each template property $t_i$. For example, letting $w_i=w(i)$ for every i in 0 . . . n be the function mapping a template property to its user specified weight, then $d_{TC}$ becomes:

$$d_{TC} = \frac{M * \sqrt{\sum_{i \in T \cap C} ((w_i)(t_i - c_i))^2}}{|T \cap C|} \quad [5]$$

The two heuristics may be used alone or in combination with each other to adjust the distance calculation.

The first heuristic adjusts the distance based on the number of axes used in the comparison. This causes the algorithm to prefer a template which has many attributes in common with the bandwidth profile.

The second heuristic permits the user to specify a set of weights indicating the relative importance of each template property. The weight may be specified as a real number between 0 and 1, where template properties closer to weight 0 are more important than template properties closer to weight 1. This heuristic is valuable if, for instance, the user wants to match templates based on Committed Information Rate and doesn't care about Peak Information Rate.

Another implementation of this invention may use an R-Tree or similar spatial indexing data structure to store the template coordinates, and query the R-Tree using the bandwidth profile coordinates. Such an implementation would be used when the cost of creating and maintaining the R-Tree is lower than the cost of a brute-force comparison of all templates to all bandwidth profiles.

Accordingly, for each template-bandwidth profile comparison, the network management system follows these steps:

First, the network management system finds the set of shared properties between the template and the bandwidth profile. If the set is empty, the network management system proceeds to the next template.

Next, the network management system uses the shared properties to define a sub-space of the shared coordinate system, as shown in FIG. 8.

Next, the network management system uses the equations [3], [4] and/or [5] to calculate the Euclidean distance between the template and the bandwidth profile in the sub-space.

Finally, the template corresponding to the minimum distance is associated with the network service model.

In the special case where two or more templates are equidistant to the bandwidth profile, a template may either be arbitrarily assigned, or additional properties of the templates may be compared to guarantee consistent assignment. For instance, the algorithm may select the first equidistant template in a lexicographical ordering based on the template name. This method requires at least one template property to be unique among all templates.

For a point-to-point (E-LINE) service, the comparison is slightly more complicated. In this case, the service template may specify different traffic requirements for each endpoint (referred to as "EndA" and "EndZ". The discovered network service model may not distinguish between endpoints. Because of this restriction, the network management system may use a slightly different fit algorithm as shown in FIG. 15.

Figure 15:
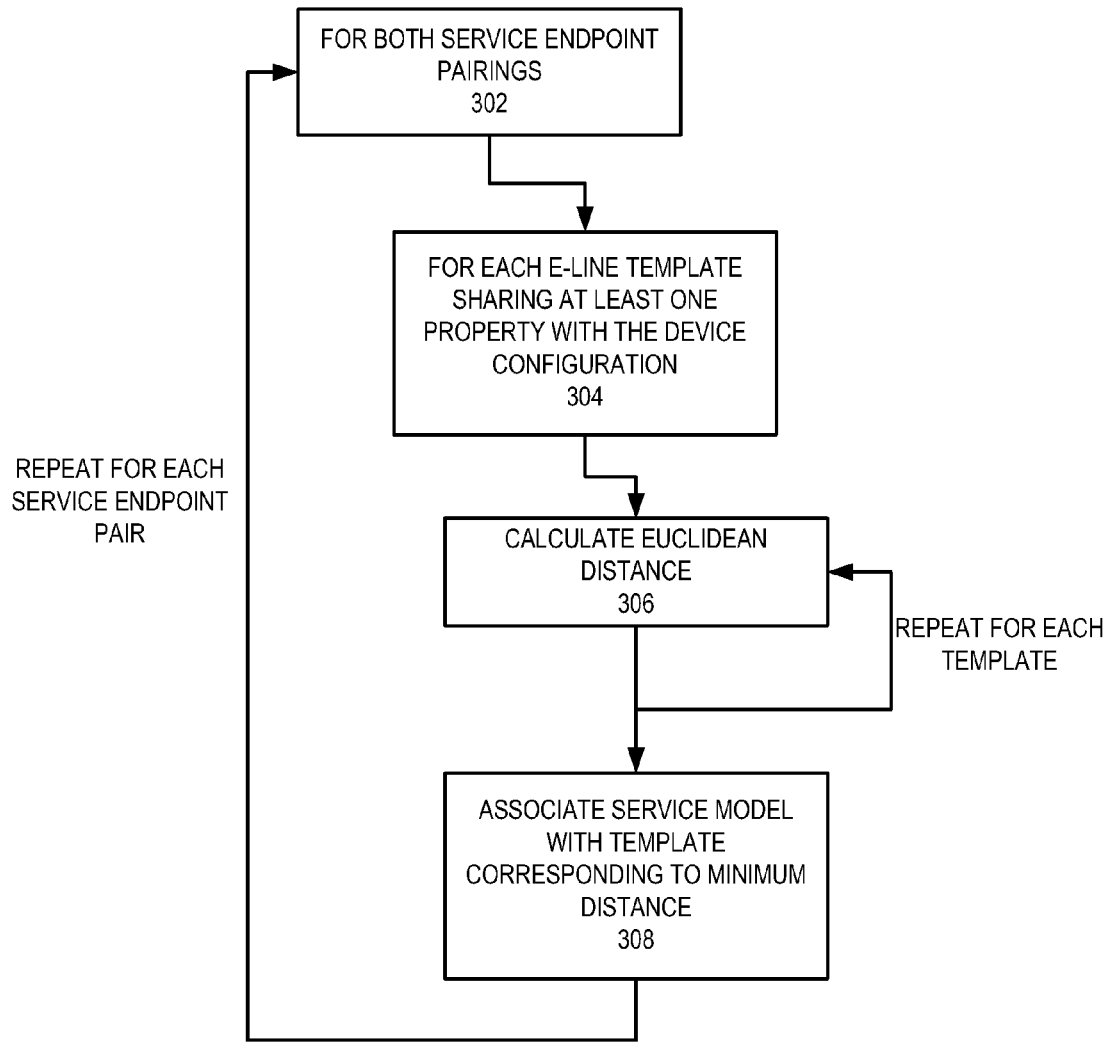
FIG. 15 is a graph illustrating systems/methods for associating a Network Service Model with a Network Service Template in the case of a point-to-point system.

Referring to FIG. 15, for both service endpoint pairings [(EndA, EndZ), (EndZ, EndA (block 302), and for each E-LINE template that shares at least one property with the device configuration (block 304), the network management system calculates $d_c$ as shown above for a multi-point case (block 306), except that for a point-to-point service it is the sum of the $d_{TC}$'s for each endpoint.

Swapping the endpoint pair configuration accounts for the case where the E-LINE template specifies different service parameters for each endpoint, since the discovered Network Service Model may not distinguish between "End A" and "End Z."

For each endpoint pairing ↔ E-LINE template comparison, the "End A Distance" is calculated as the distance between the arbitrarily-assigned "End A" in the Network Service Model to the "End A" in the E-LINE template.

The "End Z Distance" is calculated in a similar manner.

In block 306, the distance between the E-LINE template and the Network Service Model is set to the sum of the End A Distance and the End Z Distance.

Finally, the E-LINE template corresponding to the minimum distance is assigned to the Network Service Model.

Figure 16:
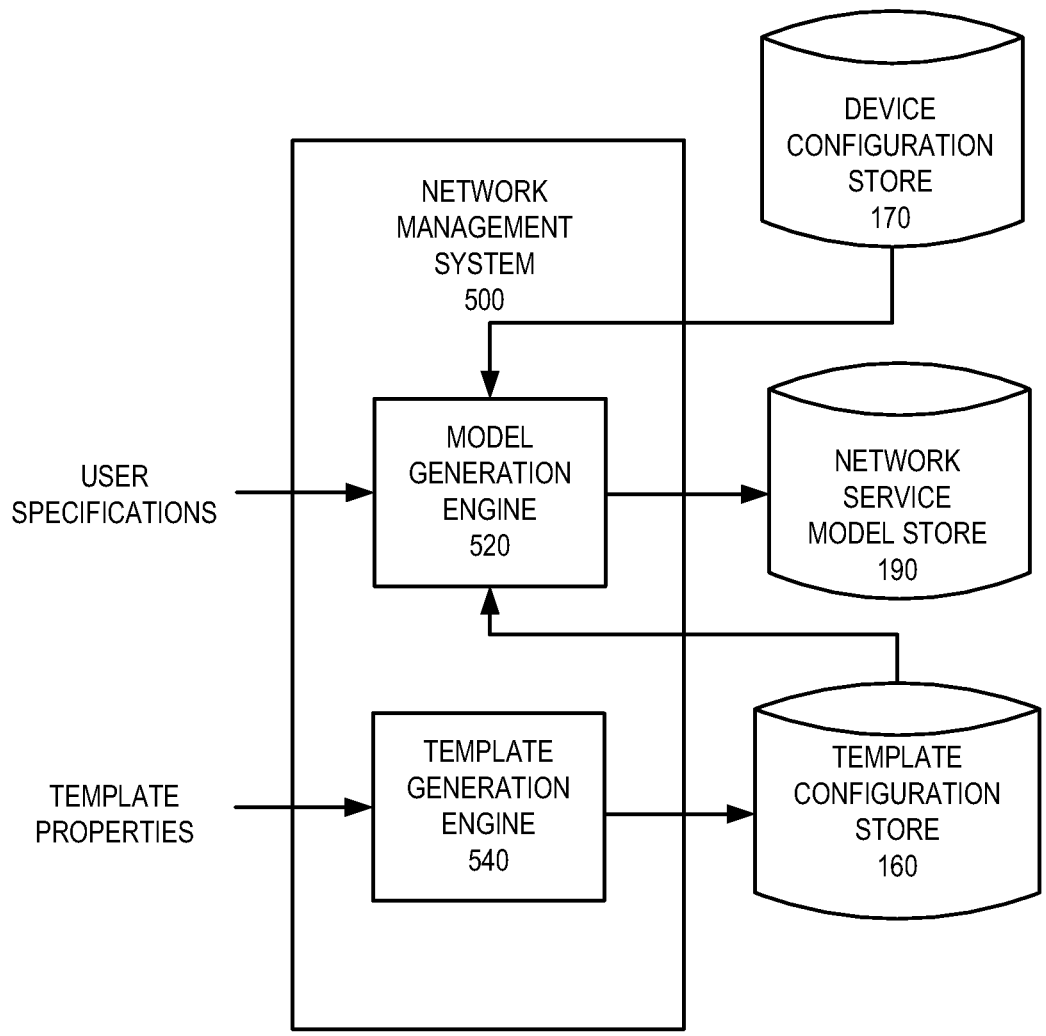
FIG. 16 is a schematic diagram of a network management system in accordance with some embodiments.

A network management system 500 according to some embodiments is illustrated in FIG. 16. The network management system 500 includes a model generation engine 520 and a template generation engine 540. The template generation engine generates Network Service Templates based on user-supplied template properties and stores the Network Service Templates in a Template Configuration Store 160, as illustrated, for example, in FIG. 9.

The model generation engine 520 generates Network Service Models in accordance with user specifications based on network topology information obtained from a device configuration store 170 and associates the Network Service Models with Network Service Templates stored in the template configuration store 160 in accordance with the operations illustrated in FIGS. 10-15. Network Service Models are then stored in the network service model store 190.

The network service model store 190, template configuration store 160 and device configuration store 170 may be integrated within the network management system 500 and/or may be implemented as remote databases that are accessible by the network management system 500.

The user of a network management system according to some embodiments may not be required to manually associate a service template (which represents a service characterization, category or service level agreement) with each discovered network service. This is especially important when the network management system is installed in a brown-field network deployment, where there may be thousands or tens of thousands of new services.

Although generally described herein in connection with the Ericsson IPT NMS, it will be appreciated that embodiments of the present invention may be applied to many different types and brands of network management systems.

Embodiments of the present invention have been described with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of assigning network service templates in a communication network comprising a plurality of network elements that are configured to implement a plurality of network services, the method comprising:
   providing a plurality of network service templates for a first network service, wherein the plurality of network service templates define respective first sets of network service parameters for providing the network service;
   providing a network service model for providing the first network service by at least one network element in the communication network, wherein the network service model defines a second set of parameters for providing the network service;
   comparing the plurality of network service templates with the network service model;
   associating at least one network service template with the network service model in response to the comparison;
   generating a plurality of third sets of parameters, each of the third sets of parameters comprising an intersection of one of the plurality of first sets of parameters and the second set of parameters;
   defining a plurality of shared coordinate systems based on the plurality of third sets of parameters; and
   for each of the shared coordinate systems, generating a metric based on the parameters of the network service model and the network service template represented in the shared coordinate system;
   wherein comparing the network service model and the plurality of network service templates comprises evaluating the metric for the network service model and the plurality of network service templates and comparing the results of the evaluation.

2. The method of claim 1, wherein the metric comprises a Euclidean distance in each respective shared coordinate system between a first coordinate in the shared coordinate system representing the network service model and a second coordinate in the shared coordinate system representing a selected one of the plurality of network service templates.

3. The method of claim 2, wherein the Euclidean distance $d_{TC}$ is calculated as follows:

$$d_{TC} = \sqrt{\sum_{i \in T \cap C} (t_i - c_i)^2}$$

where $t_i$ is the value of the ith parameter defined in the network service template T and $c_i$ is the value of the ith parameter in the network service model C.

4. The method of claim 1, further comprising:
   normalizing values of the parameters before evaluating the metric.

5. The method of claim 4, wherein normalizing the values of the parameters comprises normalizing the values of the parameters based on values of the parameters in the network service model and the plurality of network service templates.

6. The method of claim 5, wherein normalizing the values of the parameters comprises normalizing the values of the parameters using the following formulas:

$$p_n = (p_0 - p_{lb})/(p_{ub} - p_{lb})$$

$$c_n = (c_0 - p_{lb})/(p_{ub} - p_{lb})$$

wherein $p_n$ comprises the normalized parameter in the network service templates; $c_n$ comprises the normalized parameter in the network service model; $p_0$ comprises the non-normalized parameter in the network service templates; $c_0$ comprises the non-normalized parameter in the network service model; $p_{lb}$ comprises the lower boundary of the parameter in the network service templates and the network service model; and $p_{ub}$ comprises the upper boundary of the parameter in the network service templates and the network service model.

7. The method of claim 1, wherein evaluating the metric comprises:
   disregarding network service templates for which a parameter of the network service template is less favorable than a corresponding value of the parameter defined in the network service model.

8. The method of claim 1, wherein evaluating the metric comprises:
   disregarding network service templates that do not define values for all of the parameters for which values are defined in the network service model.

9. The method of claim 1, further comprising weighting the metric before making the comparison.

10. The method of claim 9, further comprising weighting the metric in accordance with the following equation:

$$d_{TC} = \frac{M * \sqrt{\sum_{i \in T \cap C}(t_i - c_i)^2}}{|T \cap C|}$$

where M comprises a maximum cardinality of all of the network service templates.

11. The method of claim 9, further comprising weighting the metric in accordance with the following equation:

$$d_{TC} = \frac{M * \sqrt{\sum_{i \in T \cap C}((w_i)(t_i - c_i))^2}}{|T \cap C|}$$

where M comprises a maximum cardinality of all of the network service templates and $w_i$ comprises a weight assigned to the ith parameter.

12. The method of claim 1, wherein the network service comprises a point-to-point service that defines service parameters for first and second endpoints, the method further comprising evaluating a combined metric for both endpoints.

* * * * *

UNITED STATES PATENT AND TRADEMARK OFFICE
CERTIFICATE OF CORRECTION

Page 1 of 1

PATENT NO. : 8,713,184 B2
APPLICATION NO. : 13/327538
DATED : April 29, 2014
INVENTOR(S) : Weeks It is certified that error appears in the above-identified patent and that said Letters Patent is hereby corrected as shown below:

In the Specification

In Column 13, Line 3, delete "$d_c$." and insert -- $d_{TC}$ --, therefor.

In the Claims

In Column 17, Line 13, in Claim 11, delete "followina eauation:" and insert -- following equation: --, therefor.

Signed and Sealed this
Ninth Day of September, 2014

Michelle K. Lee
*Deputy Director of the United States Patent and Trademark Office*